United States Patent [19]

Shah

[11] 4,443,517
[45] Apr. 17, 1984

[54] GASKETING MATERIAL

[75] Inventor: Kanu G. Shah, Arlington Heights, Ill.

[73] Assignee: Dana Corporation, Toledo, Ohio

[21] Appl. No.: 374,995

[22] Filed: May 5, 1982

[51] Int. Cl.$^3$ ............................................. D04H 1/08
[52] U.S. Cl. .................................. 428/281; 162/181.9; 277/DIG. 6; 428/280; 428/283; 428/285; 428/367; 428/402; 428/408; 428/457
[58] Field of Search ............... 428/195, 198, 206, 244, 428/280, 281, 285, 283, 360, 367, 408, 457, 323, 317.9, 402; 277/DIG. 6; 162/181.9, 146, 145

[56] References Cited

U.S. PATENT DOCUMENTS

| 2,473,528 | 6/1949 | Hoover | 428/244 |
| 3,002,850 | 10/1961 | Fischer | 428/244 |
| 3,231,460 | 1/1966 | Andrews | 428/422 |
| 4,042,747 | 8/1977 | Briton et al. | 428/317.9 |
| 4,235,027 | 11/1980 | Singh | 428/317.9 |
| 4,296,168 | 10/1981 | Ambrose | 428/288 |

FOREIGN PATENT DOCUMENTS 961636  6/1964  United Kingdom ............. 162/181.9

OTHER PUBLICATIONS

C & En Apr. 1, 1963 vol. 41 #13 "Carbon Web Gives High Adsorption".

*Primary Examiner*—James J. Bell
*Attorney, Agent, or Firm*—Wilson, Fraser, Barker & Clemens

[57] ABSTRACT

A material suitable for use in gaskets is disclosed. The material can comprise: (a) a mass of intermeshed fibers bonded to one-another at points of contact by an elastomeric binder; and (b) graphite distributed throughout the intermeshed fibers in an amount of from about 45% to 95% of the total weight of the material. The fibers can be organic and selected from the group consisting of nylon, polyester, polyamide, aramid and polybenzimidazole, or of cellulose, ceramic, glass or wollastonite. A gasket comprising the material, and a gasket comprising at least one surface layer and at least one additional layer of the material bonded thereto are also disclosed.

22 Claims, No Drawings

GASKETING MATERIAL

BACKGROUND OF THE INVENTION

1. Field of the Invention

This invention relates to materials for gaskets, and more particularly to a graphite-containing gasketing material adapted for both high-temperature (e.g., greater than 1000° F.) and low-temperature service applications.

2. Background Art

Numerous materials are known which are suitable for use in gaskets, for example, to provide a fluid-type seal between engaging pipes, conduit or similar confronting or mating parts. In applications such as sealing in cylinder heads of internal combustion engines, valves of high-temperature process lines and various types of machinery operating at high temperatures, gaskets are often subjected to especially severe thermal and mechanical stress in service. In general, conventional gaskets which are employed in such applications comprise a base sheet of metal or of fibrous composition which is held together by a suitable binder, and a deformable layer or bead which covers all or only selected areas of the base sheet. In service, the deformable layer, under pressure, spreads to conform to the surfaces of the mated parts between which the gasket lies, helping to achieve a desired seal between the parts.

Particularly in high-temperature and abrasive applications, the material of a gasket should be especially resistant to the severe stresses of service. The gasket material should also enable the gasket, following use, to be removed from between engaged parts without sticking thereto. Accordingly, various materials, compositions, and structural combinations have been suggested for use in gaskets. For example, U.S. Pat. No. 2,055,471 to Balfe discloses a laminated material having a fibrous, compressible layer and a layer of graphite or of a graphite mixture bonded thereto to provide non-sticking properties. Also disclosed is treatment of the graphite layer with an adhesive composition such as sodium silicate, shellac, lacquer or varnish, to form a protective skin for the laminate. In U.S. Pat. No. 3,002,850 to Fischer graphite is disclosed as a component of a low-friction sheet material. The material comprises a fabric sheet coated with a composition containing an acrylic resin and finely-divided graphite, the purpose of the coating being to minimize heat and wear from abrasive machinery parts in contact with the material. U.S. Pat. No. 3,231,460 to Andrews discloses a sheet material for gaskets which comprises fibrous asbestos impregnated with polytetrafluoroethylene, and bonded to an unimpregnated fibrous material to form a laminate. U.S. Pat. No. 4,006,881 to Gaillard discloses a fluid-type packing for closure devices. Part of the packing is composed of a sheet of carbonaceous material formed from carbon fibers and expanded graphite; the sheet is said to be compacted at least partially by compression transverse to the plane thereof.

Materials are known which are composed predominately of graphite, and which do not have a significant non-graphite fiber content. Such known materials are capable of performing satisfactorily in many gasketing applications, and of exhibiting many properties, such as temperature resistance, wear resistance and lubricity, which are normally associated with graphite. However, heretofore known materials are generally expensive, by comparison with other conventional gasketing materials, require special processing and handling procedures and do not, because of relatively low tensile strength and resistance to tearing, readily adapt to continuous production processes. A particular problem in continuous, mass production of graphite-based material is that it has not heretofore been feasible to produce large quantities of the material in sheet form on conventional equipment, for example, paper-making equipment, and then to store the material in large sheets or rolls prior to its being further processed or stamped into a desired form for the particular gasketing application.

BRIEF DESCRIPTION OF THE INVENTION

The present invention is based upon the discovery of a novel, graphite-containing material suitable for use in gaskets. Such a material has been found to be one which is not only particularly advantageous for producing gaskets capable of withstanding severe thermal and mechanical stresses, but also one which can be readily produced in large sheets, and on conventional, available paper-making equipment, thereby significantly reducing production expense by comparison with heretofore known graphite-based materials, and enabling mass production thereof. Moreover, the material provided by the invention, in service, exhibits wear-resistant, lubricious and non-sticking properties without requiring an additional layer or coating to be applied thereto, and can be stored after manufacture in large volume, for example in rolls or in continuous strips, while exhibiting good tensile strength and resistance to tearing.

The material provided by the invention comprises:
   (a) a mass of intermeshed fibers bonded to one-another at points of contact by a binder; and
   (b) graphite distributed throughout the intermeshed fibers in an amount of from about 45 to 95 percent* of the total weight of the material.

*As used herein and in the appended claims, the term "percent" refers to percent by weight, unless other indicated.

Preferably, the binder is elastomeric and the intermeshed fibers of the material of the invention are organic, being composed, for example, of nylon, polyester, polyamide, aramid or polybenzimidazole. The fibers can also be composed of cellulose or of substances such as various glasses or ceramics.

The material provided by the invention can be advantageously used, in any desired form, for various gasketing and packing applications. However, a gasket particularly advantageous for such applications wherein high temperatures are encountered is also provided by the instant invention, and includes the material of the invention. Such a gasket can comprise at least one base layer, for example of sheet metal, and at least one layer of the material bonded thereto.

Accordingly, it is an object of the instant invention to provide a material suitable for use in gaskets.

It is another object of the invention to provide a graphite-containing gasketing material suitable for both low and high-temperature applications.

It is a further object of the invention to provide a graphite-containing gasketing material of good tensile strength and tear resistance, and which is suitable for high-volume manufacture in sheet form and storage in rolls.

It is a still further object of the invention to provide a gasket including the material provided by the invention.

Other objects and advantages of the present invention will be apparent from the following detailed description, which is intended only to illustrate and disclose, and in no way to limit the invention except as defined in the appended claims.

DETAILED DESCRIPTION OF THE INVENTION

The following Examples describe preferred embodiments of gasketing material according to the instant invention and preferred procedures and ingredients for the fabrication thereof.

EXAMPLE 1

Material according to the invention was produced from a uniform blend comprising substantially the following ingredients: 85 g. of Asbury No. 1 flaked graphite*, 3 g. of DuPont "Kevlar" organic fiber, 6 g. of Westvaco "MK-90" bleached cellulose pulp, 6 g. of an acrylic latex resin binder** and 1000 g. of tap water. The foregoing ingredients were charged to the mixing bowl of a conventional laboratory-size blender and mixed together therein at high speed for approximately 90 seconds, at the end of which time a uniform mixture was observed to be formed. A 1.0 g. quantity of aluminum potassium sulfate was then added to the mixture and mixed thereinto until the binder was observed to precipitate; the pH of the mixture was measured at this time and found to have increased to about 9. The blended contents of the mixer were then poured through No. 20 filter paper in a Buchner funnel, after which the filtrate was separated and the filter paper, together with the wet mixture deposited thereon, was removed from the funnel and placed in a drying oven, temperature approximately 212° F., for about 2 minutes to volatilize additional water. The semi-dry mass resulting was then separated from the filter paper and pressed, pressure about 1000 psi, in a Wabash hydraulic laboratory press heated to a temperature of about 212° F. A substantially planar, paper-like sheet material was formed after pressing, which had a nominal thickness of about 0.032 inch.

*Commercially available from Asbury Graphite Mills, Inc., and reported to have a carbon content of about 94 percent and a particle sizing of minus 50 plus 80 mesh.
**The resin used was "Hycar 2600×120," commercially available from B. F. Goodrich Co.

EXAMPLES 2-6

Materials according to the invention were produced substantially as described in Example 1, above, except that major constituents used and the amounts thereof (except for the amount of water) were varied, to produce pressed sheets of material comprising substantially the compositions set forth in the following table. All numbers in the table represent the weight, in grams, of each major constituent used to produce the materials.

| EXAMPLE NO. | 2 | 3 | 4 | 5 | 6 |
| --- | --- | --- | --- | --- | --- |
| Superior 1601 graphite | 80 | — | — | — | — |
| Asbury No. 1 flaked graphite | — | 85 | 85 | 85 | 85 |
| Polyester fiber | 8 | 5 | — | — | — |
| Nylon fiber (¼" chopped) | — | — | 3 | — | — |
| Pulp (MK-90) cellulose fiber | — | — | — | 9 | 6 |
| Nylon fiber (¼", 6 den.) | — | — | — | — | 3 |
| Softwood Pulp cellulose fiber | 6 | 5 | 3 | — | — |
| Wollastonite fiber | — | — | 3 | — | — |
| Hycar 2600 × 120 acrylic latex resin binder | 6 | 5 | 6 | — | — |
| Hycar 1561 × 84 acrylonitrile-butadiene resin binder | — | — | — | 6 | 6 |

It will be appreciated that in addition to a laboratory-scale procedure, such as described above in Examples 1-6, a larger-scale process can be advantageously used to produce material according to the invention in elongated sheets on largely conventional paper-making machinery. The material, after fabrication, can then be stored in substantial quantities in roll form. Examples 7-17, below, illustrate such a larger-scale process by which the material can be made.

EXAMPLES 7-17

Additional materials according to the invention were produced on a conventional, continuous-process fourdrinier paper-making machine. Aqueous suspensions of ingredients, comprising the compositions set forth in the table below, for each Example, were prepared in the headbox of the fourdrinier machine. Referring to each Example, the order of addition to the headbox of the constituents listed was as follows: (1) all organic fibers (if any); (2) graphite; (3) all inorganic fibers and cellulose (if any); and (4) binder. During the introduction to the headbox of the foregoing classes of ingredients, the amount of water indicated was charged and mixed with the other ingredients until a uniform mixture of material was formed. Also, during formation of the material, minor amounts of ammonia, aluminum potassium sulfate, and from 0.6 to 1.0 percent of the total mixture of "Hydroid 778,"* a retention aid, were added as needed. The ammonia and alum were added to adjust the pH during mixing to values between about 4.5 and 9.5.

*Commercially available from Calgon Corporation.

| EXAMPLE NO.* | 7 | 8 | 9 | 10 | 11 | 12 | 13 | 14 | 15 | 16 | 17 |
| --- | --- | --- | --- | --- | --- | --- | --- | --- | --- | --- | --- |
| Total Headbox Mixture Weight (grams) | 12,500 | 10,000 | 10,000 | 12,500 | 12,500 | 12,500 | 12,500 | 12,500 | 12,500 | 12,500 | 12,500 |
| Water (Liters) | 500 | 400 | 400 | 500 | 500 | 500 | 500 | 500 | 500 | 500 | 500 |
| Asbury No. 1 Graphite | — | — | 85.0 | — | — | — | — | — | 13.0 | — | — |
| Asbury No. 2 Graphite | — | — | — | — | — | — | — | — | 26.0 | 85.0 | 85.0 |
| Asbury No. 3 Graphite | 85.0 | 85.0 | — | 90.0 | 90.0 | 80.0 | 88.0 | 68.0 | 46.0 | — | — |
| Kevlar Fiber | 3.0 | 3.0 | 3.0 | 5.0 | 3.0 | — | 3.0 | — | 3.0 | 3.0 | 3.0 |
| MK-90 Cellulose Pulp | 6.0 | 6.0 | 6.0 | — | 3.0 | 4.0 | 5.0 | 4.0 | 6.0 | 6.0 | 6.0 |
| Hycar 1561 × 84 resin | — | — | — | — | — | 5.0 | — | 6.0 | — | — | 6.0 |

-continued

| EXAMPLE NO.* | 7 | 8 | 9 | 10 | 11 | 12 | 13 | 14 | 15 | 16 | 17 |
|---|---|---|---|---|---|---|---|---|---|---|---|
| Hycar 2600 x 120 resin | 6.0 | 6.0 | 6.0 | 5.0 | 4.0 | — | 4.0 | — | 6.0 | 6.0 | — |
| Nylon Fiber (¼ × 6.0 den.) | — | — | — | — | — | 2.0 | — | 4.0 | — | — | — |
| LFE 100 Fiber | — | — | — | — | — | 9.0 | — | 5.0 | — | — | — |
| Vermiculite #4 | — | — | — | — | — | — | — | 13.0 | — | — | — |

*All constituents, except for water, are reported by percent of the total headbox mixture weight (excluding the weight of water).

The material produced as described in the paragraph above was deposited upon a continuous forming wire of the table of the fourdrinier machine; as the mixture was released to the wire, it had a consistency of about 25 grams per liter. After the mixture on the wire had passed to the end of the fourdrinier table, it was observed to have become a self-supporting mass of material from loss of water through the mesh of the forming wire, having a consistency on the order of one-hundred times that of the suspension as originally deposited upon the wire. The mass, essentially a wet-formed sheet of paper-like material, was next removed from the wire and transferred across an open draw to a moving felt which carried the sheet to the press section of the machine. The sheet was then wet-pressed to reduce its bulk and increase its consistency. The pressed sheet was then fed through a series of conventional drying rollers of the machine; these rollers were steam-heated to between 220° and 250° F. The dried sheet was passed through a three-roll calender mill to produce finished sheet material having a nominal thickness of about 0.032 inch. The finished sheet of material so produced appeared, upon inspection, to have no surface cracks or blemishes, such as might have resulted from passing over the rolls of the drying and calendering operations; it also was observed to be of apparent high strength, and was subsequently rolled for storage without exhibiting noticeable tearing or surface cracking.

The ability of the material of the invention, when produced as described in the Examples above, to resist cracking and tearing, is believed to be attributable to its structure, which provides good tensile strength and tear strength by comparison with conventional materials. The tensile strength of the material has been found to be on the order of from about 200 psi to 1000 psi when it is properly produced, for example as described above, and is believed to result from the unexpectedly advantageous combination of graphite, fibers and binder. This particularly advantageous combination of constituents provides a structure for the material which enables it to be produced in large quantities and in substantially-sized elongated sheets, and to be thereafter stored in roll form, without incurring significant damage from tearing, cracking, or other deterioration attributable to flexural or other mechanical stresses.

It is also to be appreciated that such properties of the material of the invention, as its capability of being used over a wide range of operating temperatures and its ability to form a non-sticking and wear-resistant, fluid-type seal between mated parts, are also attributable to its unexpectedly advantageous composition. Such composition comprises fibers which are intermeshed (believed to contribute especially to high-temperature resistance, tensile and tear strength); the intermeshed fibers are bonded to one-another at their points of contact by a binder (believed to contribute particularly to tensile strength and, when elastomeric, to resiliency and compliancy) and graphite (believed to contribute to wear resistance and lubricity). The graphite is distributed throughout the fibers in an amount of from about 45% to 95% of the total weight of the material. If an amount of graphite lower than about 45% is used, the advantageous properties of graphite, in the finished material, will not be fully realized. If the amount of graphite in the material exceeds about 95%, it is believed that the intermeshed fiber structure of the material will become insufficient to provide the advantageous strength and other properties exhibited by the material of the invention.

It has been found that although any commercially-available organic or inorganic fibers, or mixtures thereof, are suitable for use in the material of the invention, it is desirable to use inorganic fibers to produce material intended for extremely high-temperature service environments. For example, ceramic, glass and wollastonite fibers all are suitable for use in material which, in service, is subjected to temperatures higher than about 1000° F., for example as in many internal combustion engines. However, in service applications where temperatures to which the material is subjected are not much higher than about 1000° F., cellulose and organic fibers are suitable. Such organic fibers can include, for example, nylon, "Kevlar," polyester, polyamide, aramid and polybenzimidazole. It will also be appreciated that the fibers, whether inorganic or organic, can be of any conventional, appropriate size; the selection, in any particular case, of an appropriate fiber size will ordinarily be a matter of choice and will usually depend largely on such factors as commercial availability, and also upon other considerations such as expense. However, it is preferred that the fibers not be greater than about ⅜ inch or less than about 1/16 inch in length.

Examples of suitable binders include organic binders having elastomeric properties such as acrylonitryl-butadiene and acrylic latex, and inorganic binders such as, for example, a silica binder commercially available as "Ludox" from DuPont. It will be appreciated that the binder can be either elastomeric or non-elastomeric and that other suitable binders include naturally-occurring resinous substances, or various synthetic resins and elastomers, and natural or synthetic rubbers including polysulfide, polychloroprene and the like. Accordingly while the identity of the binder is not critical to the overall advantageous properties of the material of the invention, the use of an inorganic binder may improve slightly the high-temperature resistance thereof, and the use of an elastomeric binder may improve the elasticity of the material.

Material provided by the instant invention, it will be appreciated, can also include conventional fillers, for example, various clays commonly used in gasketing materials, or substances such as vermiculite.

The particular type and particle sizing of the graphite used can also be selected, as desired, to satisfy a particular requirement of the service conditions under which the finished material is to be used. However, flake graphites are generally preferred for use because of their particular advantages in terms of lubricity and resistance to wear. For example, the commercial graphites designated "Asbury No. 1," "Asbury No. 2" and "Asbury No. 3" (available from Asbury Graphite Mills, Inc.) are all suitable for use; the reported carbon contents of these graphites range from about 93% to 95%, and their reported particle sizes range from minus 30 plus 80 mesh to minus 60 plus 325 mesh. In addition, graphites such as those designated "Superior 2601" and "Superior 1601", both commercially available from Superior Graphite Company, are also suitable.

It will be appreciated that when a largely conventional, paper-making process is used to produce material according to the invention, for example as described in Examples 7–17, above, the fibers of the finished material so produced will be directionally oriented. Moreover, when such a process is used, the particular orientation of the fibers will depend largely upon the machine by which the material is produced, and various other factors which are analogous to factors involved in the production of conventional papers and are therefore outside the scope of the present disclosure. Although it is believed that there is no particular advantage to an oriented fiber structure in the material of the invention, so far as its ability to perform satisfactorily in service is concerned, a more consistent, uniform overall finish has been found to result when it is made on conventional paper-making machinery, particularly after the material has been subjected to calendering.

While the material provided by the instant invention can be produced in any desired thickness, it will be appreciated that a desirable thickness, in any particular case, will depend upon such factors as the service application for which the material is intended and the type of process used for producing it. For example, typical nominal thicknesses for material produced for high-temperature gasketing use in internal combustion engines are from 0.020 to 0.070 inch. In addition, when a commercial-scale, paper-making process is used, the thickness, or caliper, of the material usually can be carefully controlled to produce a material suitable for any particular application requiring a given thickness. It will be appreciated however, that material produced according to the invention will exhibit the advantageous properties previously described, regardless of the thickness in which it is made.

Material according to the invention, because it is especially suitable for use in gaskets, can be so used in many shapes and forms without the addition thereto or combination therewith of other materials. However, it can also be used, for example, in combination with one or more additional layers comprising conventional gasketing materials bonded or otherwise adhered thereto. A surface layer of such a combination gasket produced using the material provided by the invention can comprise conventional compositions used in the art for that purpose in conventional gaskets, i.e., any of a number of relatively dense sheet materials having a substantially uniform thickness. The material of the invention can be readily bonded to such an additional sheet of material by employing a suitable adhesive selected from numerous conventional ones available and commonly used for such purposes. The additional sheet of such a combination gasket can be of fibrous composition; for example, organic fibers, cellulose, or inorganic fibers such as asbestos are all suitable. The additional sheet also can comprise fibrous mixtures, and can include metallic fibers held together by a suitable fibrous reinforcing or bonding agent. Such structures as a semi-porous fiber board reinforced with a thermosetting resin, such as a sheet of metal fibers bonded with cured rubber or a phenolic resin, can be used. In addition, because the material of the present invention is particularly suitable for high-temperature applications, the additional base sheet can be a metal sheet such as sheet of steel, aluminum, zinc, tin, copper, or alloys of such metals. The additional sheet may range in thickness from about 0.002 inch to 0.250 inch for most such combination gaskets, and preferably may range in thickness from about 0.005 inch to about 0.065 inch, although sizes outside of these ranges can be used depending upon the ultimate thickness desired for the gasket. It is also to be appreciated that such a combination, or multiple-layer gasket, can be produced from material according to the invention which is bonded to other conventional materials by means of any conventional process for making such gaskets commonly used, and that such a gasket, can, therefore, be of any conventional form or fabricated into any physical shape.

Although preferred embodiments of the invention have been described, it is to be understood that the scope of the invention is not limited thereto or thereby. It will be apparent that various changes or modifications can be made in the specific disclosure hereof without departing from the spirit and scope of the invention as defined in the following claims.

What is claimed is:
1. A fibrous material comprising:
   (a) a sheet of paper-like material ranging in thickness from 0.020 to 0.070 inch, and composed of a felted mass of intermeshed fibers bonded to one-another at points of contact by a binder; and
   (b) flake graphite distributed throughout the intermeshed fibers, wherein the fibers and the graphite are uniformly distributed through the sheet and the graphite constitutes from about 45% to 95% of the material based upon the weight of the fibers, the binder and the graphite.

2. The material claimed in claim 1, wherein the binder is elastomeric.

3. The material claimed in claim 1 or 2, wherein the fibers are organic.

4. The material claimed in claim 3, wherein said organic fibers are selected from the group consisting of polyester, polyamide and polybenzimidazole.

5. The material claimed in claim 1 or 2, wherein the fibers are cellulose.

6. The material claimed in claim 1 or 2, wherein the fibers are inorganic.

7. The material claimed in claim 6, wherein said inorganic fibers are ceramic.

8. The material claimed in claim 6, wherein said inorganic fibers are glass.

9. The material claimed in claim 6, wherein said inorganic fibers are wollastonite.

10. A gasket comprising at least one surface layer and at least one additional layer of fibrous material bonded to said surface layer, said fibrous material comprising a sheet of paper-like material ranging in thickness from 0.020 to 0.070 inch, and composed of a felted mass of intermeshed fibers bonded to one-another at points of contact by a binder and flake graphite distributed throughout the intermeshed fibers, wherein the fibers and the graphite are uniformly distributed through the sheet and the graphite constitutes from about 45% to 95% of the material, based upon the weight of the fibers, the binder and the graphite.

11. The gasket claimed in claim 10, wherein the binder is elastomeric.

12. The gasket claimed in claim 10 or 11, wherein said surface layer is metallic.

13. The gasket claimed in claim 12, wherein said metallic surface layer comprises steel.

14. The gasket claimed in claim 10 or 11, wherein the fibers are organic.

15. The gasket claimed in claim 14, wherein said organic fibers are selected from the group consisting of polyester, polyamide and polybenzimidazole.

16. The gasket claimed in claim 10 or 11, wherein the fibers are inorganic.

17. The gasket claimed in claim 10 or 11, wherein the fibers are cellulose.

18. The gasket claimed in claim 16, wherein said inorganic fibers are ceramic.

19. The gasket claimed in claim 16, wherein said inorganic fibers are glass.

20. The gasket claimed in claim 16, wherein said inorganic fibers are wollastonite.

21. A gasket comprising:
(a) a sheet of paper-like material ranging in thickness from 0.020 to 0.070 inch, and composed of a felted mass of intermeshed fibers bonded to one-another at points of contact by a binder; and
(b) flake graphite distributed throughout the intermeshed fibers, wherein the fibers and the graphite are uniformly distributed through the sheet and the graphite constitutes from about 45% to 95% of the gasket, based upon the weight of the fibers, the binder and the graphite.

22. The gasket claimed in claim 21, wherein the binder is elastomeric.

* * * * *